United States Patent [19]

Schindler et al.

[11] 3,920,067

[45] Nov. 18, 1975

[54] HEAT EXCHANGER FOR CONTINUOUS FLOW FLUID HEATER

[75] Inventors: Herbert Schindler, North Hollywood; Willard O. Ware, Stockton, both of Calif.

[73] Assignee: M.M.S. Limited, Alameda, Calif.

[22] Filed: Apr. 11, 1973

[21] Appl. No.: 350,097

[52] U.S. Cl............. 165/38; 122/406 R; 137/525.5; 236/92 C
[51] Int. Cl.²................................. G05D 15/00
[58] Field of Search....... 165/38; 122/367 R, 367 C; 137/525.3, 525.5, 525.7; 236/599.1, 101 A, 236/101 E, 92 C, 34.5

[56] References Cited
UNITED STATES PATENTS

| | | | |
|---|---|---|---|
| 155,667 | 10/1874 | Painter............................ | 137/525.7 |
| 2,828,723 | 4/1958 | Miller.............................. | 122/367 R |
| 3,080,155 | 3/1963 | Glitsch............................ | 137/513.5 |
| 3,134,366 | 5/1964 | Miller ............................. | 122/407 |
| 3,203,404 | 8/1965 | Miller.............................. | 122/367 R |
| 3,292,598 | 12/1966 | Miller.............................. | 122/406 R |
| 3,292,658 | 12/1966 | Scaramucci.................... | 137/525.3 |
| 3,404,837 | 10/1968 | James ............................. | 236/34.5 |
| 3,630,175 | 12/1971 | Reid................................ | 122/367 C |
| 3,664,775 | 5/1972 | Stigberg......................... | 137/525.7 |
| 3,684,169 | 8/1972 | Clinton........................... | 236/20 |

OTHER PUBLICATIONS

Trane Air Conditioning Manual, 1968, pp. 306, 307, Trane Co., Lacrosse, Wisconsin.

*Primary Examiner*—Albert W. Davis, Jr.
*Assistant Examiner*—Daniel J. O'Connor
*Attorney, Agent, or Firm*—Silverman & Cass, Ltd.

[57] ABSTRACT

A heat exchanger of the continuous flow tubular type which includes chambered header means including inlet chamber means and exhaust chamber means, a plurality of tubular elements communicating between said inlet chamber means and said exhaust chamber means along a flow path to maintain a minimum temperature differential between the interior and exterior of said tubular elements. A by-pass is defined whereby a portion of fluid is diverted from the inlet chamber to the exhaust chamber independent of said tubular elements, said by-pass including a variable flow restrictor device capable of maintaining a continuous diverted flow from said inlet chamber to said exhaust chamber in a degree related to the velocity of the fluid entering said inlet chamber. The baffle is formed of spring material capable of being deflected responsive to pressure within said inlet chamber and is mounted in intercepting relation to the mouth of the by-pass opening.

18 Claims, 6 Drawing Figures

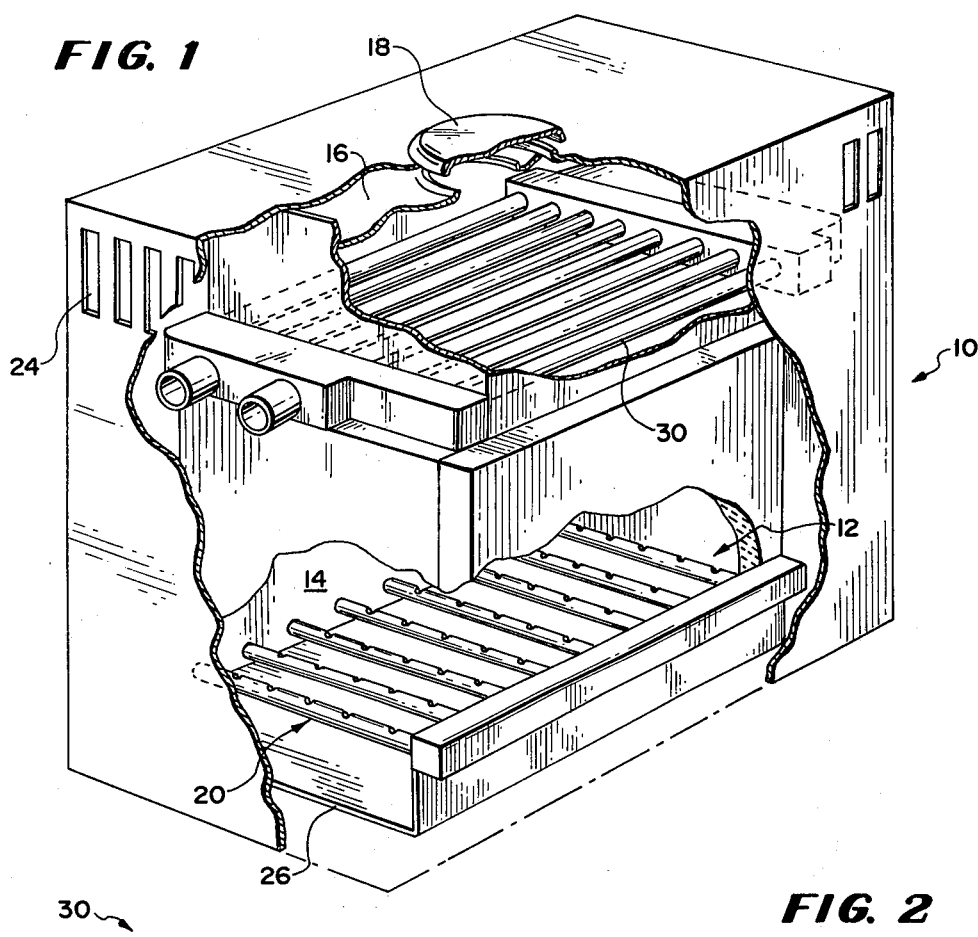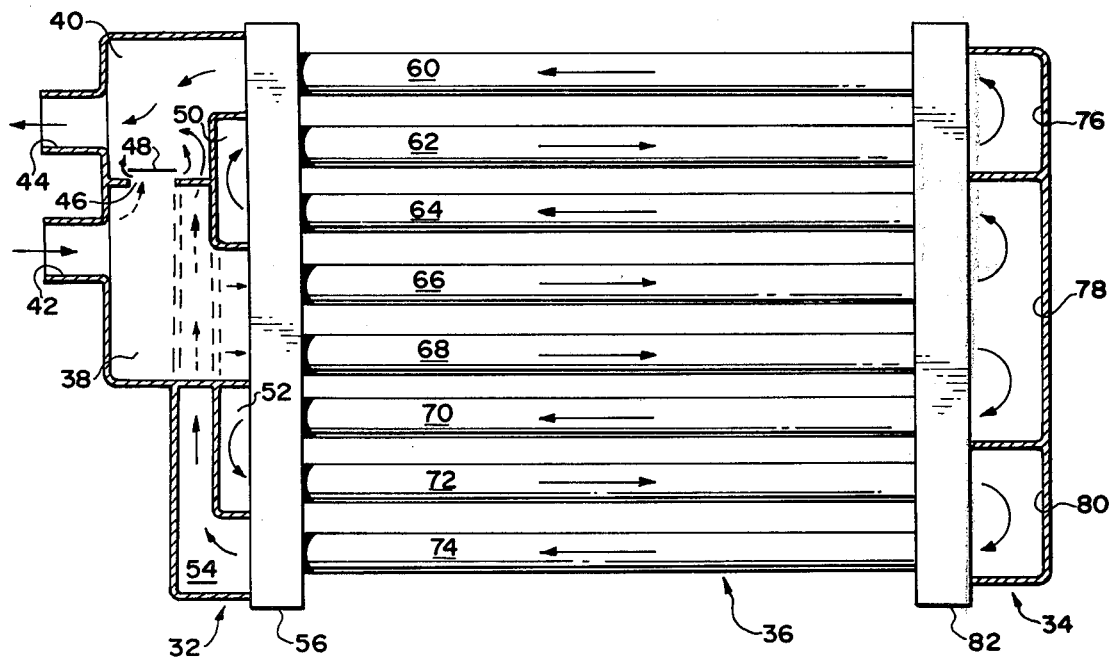

HEAT EXCHANGER FOR CONTINUOUS FLOW FLUID HEATER

FIELD OF THE INVENTION

This invention relates generally to fluid heaters and is more particularly concerned with providing improved heat exchanger means of the continuous flow, tubular type in which a flow path is defined therethrough along which the temperature differential between the interior of the heat exchange tubes and the ambient surroundings is minimized along the length of said path and, further characterized in that there is provided an improved variable flow restriction means for assuring constant flow through the heat exchanger.

BACKGROUND OF THE INVENTION

Continuous flow fluid heater appliances general operate under varying inlet fluid pressure. It is known to provide heat exchange means which include a flow path defined between an inlet and an exhaust chamber through a plurality of tubular heat exchange elements. The heat exchange elements are disposed within the appliance in intercepting relation to the flow of heated combustion products so that fluid flowing through the tubes will be heated by the hot combustion gases, the delivery temperature of the fluid at the exhaust being determined generally by the rate of flow of the fluid through the tubular elements. It is known to provide regulating means including a by-pass passage in direct communication between the inlet and the exhaust and regulator means controlling the flow of water through the by-pass passage.

Continuous flow fluid heaters, particularly those utilized in heating swimming pool water, have interrelated problems inherent in their operation which operate in reverse relation. If a substantial length of the inlet ends of the heat exchange tubes is maintained below the dew point of the ambient combustion products, condensation will form on the outer surfaces of the tubular elements, said condensation occurring because the combustion products normally are heavily saturated with water vapor ad upon being cooled below their dew point, most of the moisture will condense out of the combustion products and will result in serious corrosion problems as well as plugging of the orifices of the fuel burner.

On the other hand, if the fluid within the heat exchange tubes is heated too high, minerals will deposit from the fluid on the interior of the tubes. This not only reduces the heat transfer efficiency of the tubes but, renders the interior of the tubes subject to scale and clogging as a result of deposit thereof.

Ordinarily to obtain acceptable flow characteristics through the heat exchanger of a fluid heater, external by-pass valves, internal by-pass valves or other control devices such as governors, etc. have been provided. Such flow control devices as well as the valves are generally precision machined and quick to become inoperative through the deposit of scale, lime, dirt, etc. in the clearances between the moving parts. The rate of flow of the fluid through the heat exchange means and the delivery temperature of the fluid passing therefrom should be controlled so as to minimize both the formation of condensate and the deposit of minerals. If the flow is made low then the temperature of the water passing from the heater may be such as to promote an undesirable deposit of materials within the heat exchanger. Conversely, if the flow is rapid so that the temperature is low enough to slow up mineral deposit, then there may be undesirable formation of condensate with attendant corrosion and plugging of burner orifices. A compromise is indicated and, such compromise ordinarily takes the form of diverting a portion of the inlet water from its normal passage through the heat exchanger tubes.

Another problem encountered particularly where the fluid heater is applied to the heating of swimming pool water occurs because the water is passed through a filter before going through the heater. This complicates the compromise flow through the heat exchanger since the inlet water pressure may vary greatly. As the filter becomes clogged with foreign matter the water pressure at the heater will be reduced. This means that the flow of water through the heat exchanger will ordinarily change from relatively rapid immediately after cleaning the filter to relatively slow once the filter has been in operation for some time. In the course of rapid flow, undesirable formation of condensate is aggravated while at the other end with the slow rate of flow, the water will be overheated with undesirable deposit of materials. Thus, the by-pass passage has been provided which normally comprises precision valve means or a governor controlled either by the pressure differential between inlet and outlet or by the temperature of the water delivered from the heat exchanger or by both. It would be of considerable advantage to provide a by-pass passage with flow control structure uneffected by deposits, clogging, etc.

A still further problem is encountered where heat exchangers of the tubular type are utilized. As stated above, the tubular type heat exchanger is disposed within the path of the heated products of combustion. The temperature to which the plurality of tubes is exposed is not uniform over the plenum area. Often the temperature in the center of the plenum in which the tubular heat exchanger is disposed usually differs from the ambient temperature at the peripheral regions. It is known that the efficiency of heat transfer in a heat exchanger transferring heat energy from hot flue products of combustion to a fluid passing through tubes exposed to said flue products, depends on the total amount of heat transferred and this is a function of the surface area, the temperature differential as well as the heat transfer and resistance coefficients. Keeping other criteria unchanged, it is apparent that it would be desirable to maximize efficiency by providing means for obtaining relatively equal temperature differentials throughout the entire fluid path of the fluid to be heated.

SUMMARY OF THE INVENTION

A continuous flow heat exchanger of the tubular type which includes an inlet, an outlet, a plurality of tubes communicating between the inlet and the outlet and disposed in heat transfer relation to a heated medium, means defining a flow path to direct the fluid from the inlet first through the coldest heat exchanger tubes and then in order of increasing temperature, through the hotter heat exchanger tubes to and through the hottest of them whereby the temperature differential between the ambient and temperature of the fluid within the interior tubes is minimized.

A by-pass passage is provided communicating directly between the inlet and the outlet independent of the tubular elements, said by-pass having flow restrictor means in the form of a flexible spring-like baffle disposed at the mouth of the opening and arranged to provide variable although continuous flow of fluid from the inlet to the outlet chambers directly, thereby to be self-cleaning, uneffected by deposits or clogging responsive to inlet fluid velocity. The baffle may be made temperature responsive as well by forming it as a bimetallic element.

BRIEF DESCRIPTION OF THE DRAWINGS

FIG. 1 is a fragmentary perspective view of a fluid heater appliance shown diagrammatically and with portions broken away to illustrate the heat exchanger of the invention employed therein.

FIG. 2 is a diagrammatic representation in section of a heat exchanger constructed in accordance with the invention.

DESCRIPTION OF THE PREFERRED EMBODIMENTS

Figure 3:
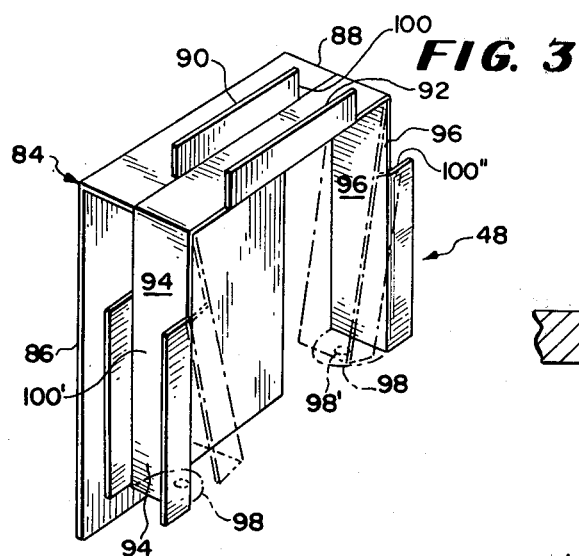
FIG. 3 is a perspective view of one embodiment of the flow restrictor means utilized in the heat exchanger of FIG. 2.
Figure 4:
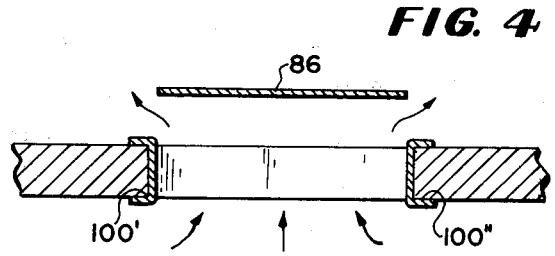
FIG. 4 is a diagrammatic representation illustrating the manner of operation of the flow restrictor means of FIG. 3.

As will be evident from the ensuing description, the heat exchanger construction according to the invention is directed to the improvement of the efficiency of heat exchanger apparatus for use in fluid heaters particularly gas fired water heaters for swimming pool water, for example.

The increase in operating efficiency is effected in a two-fold manner. First, means are provided to define a fluid flow path through the heat exchanger along which the temperature differential between the interior and exterior of the tubular members within the heating chamber is minimized along the path through said chamber. Second, variable flow restriction means are provided at a by-pass opening communicating between the inlet and outlet chambers of the heat exchanger to permit continuous but regulated diversion of a portion of the inlet fluid to the outlet without passing through the tubular elements of the heat exchanger, said flow restriction means being in the form of a spring-like baffle mounted at the by-pass opening and being velocity responsive and/or temperature responsive in controlling the degree of diversion. However, continuous flow is maintained through said by-pass at all times.

The first and the second means mutually are cooperative in establishing improved efficiency for the heat exchanger apparatus but, each can be employed exclusively one without the other to result in an improved efficiency over the structures found in the prior art.

Referring to the drawings, in FIG. 1 there is illustrated a fluid heater appliance 10 of the type which can be utilized to heat swimming pool water. The heater appliance 10 includes a combustion chamber 12 which communicates directly with a flue plenum 14 which in turn communicates with an outlet plenum 16 having an outlet opening 18. Burner means 20 is provided within the combustion chamber. Suitable entry means 24 is provided for the admission of selected quantities of exterior air for heating and combustion purposes, said air being conducted through the appliance and placed in communication with the burner means by suitable means 26.

The heat exchanger means according to the invention is designated generally by reference character 30 and is mounted within the appliance 10 at a location within the flue plenum in heat transfer relationship to the combustion products from the combustion chamber. The heat exchanger 30 comprises a pair of chambered headers 32 and 34 spaced apart and bridged by a plurality of finned heat exchanger tubes designated generally by reference character 36. The front header 32 is hollow and provided with interior chamber-defining walls, and walls defining, among other, an inlet chamber 38 and an exhaust or outlet chamber 40. Inlet port 42 and outlet port 44 are provided respectively communicating to the inlet chamber 38 and outlet chamber 40. A by-pass opening 46 is provided communicating directly between the inlet and outlet chambers 38 and 40. Flow restrictor means 48 are mounted to regulate flow diversion, from the chamber 38, of a quantity of fluid to the outlet chamber 40 without permitting same to pass through the tubes 36.

Interior flow chambers 50, 52 and 54 are defined within the header 32. The header 32 also includes means for mounting one end of each of the tubes 36 for communication with the respective interior chambers of the header 32. Accordingly, a flow path is defined (see the arrows) within header 32, along selected ones of said tubes 36 and the header 34. The said flow path through the heat exchanger is so arranged that the temperature differential between the interior of the tubes and the ambient surroundings is minimized along said flow path.

Individual heat exchanger tubes 60 through 74 are arranged parallel and spaced one relative the other, secured in respective suitable openings communicating within the desired chambers of the header 32 and 34.

Rear header 34 is provided with chambers 76, 78 and 80 mounted to a member 82 having a plurality of spaced openings alinged with the openings in member 56 and adapted to receive the opposite ends of the tubes 36. Chambers 76, 78 and 80 are defined within rear header 34 and arranged so to establish communication between the selected heat exchanger tubes 36 in a manner establishing a desired flow path. The fluid to be heated enters under pressure through the inlet port 42 and passes from the inlet chamber 38 through the finned tubes 66 and 68 into chamber 78 of header 34. From chamber 78, the fluid passes equally through tubes 64 and 70 to enter chamber 50 and 52 respectively. From chambers 50 and 52 respectively, the fluid passes through tubes 62 and 72 respectively, into respective chambers 76 and 80. From chambers 76 and 80 respectively, the fluid passes by way of tubes 60 and 74 into chambers 54 and outlet chamber 50. The fluid from chamber 54 enters the outlet chamber 40 and from the outlet chamber 40, passes through the outlet port 44.

A portion of the fluid entering by way of port 42 is diverted from the chamber 38 by way of by-pass opening 46 directly into the outlet chamber 40. Flow is regulated by the flow restrictor means 48 mounted about the opening 46 and arranged in intercepting relation to the flow through the by-pass opening 46 to control same but always to permit some flow continuously therethrough. The fluid flowing through the heat exchanger tubes 36 is heated in a conventional manner while making four passes across the heated plenum. In this manner heat energy from the flue products of combustion is transferred to the fluid passing through the tubes 36. Fluid which by-passes the tubes 36 is mixed with the heated fluid within the outlet chamber 40.

As the fluid enters the heat exchanger tubes 36 and is heated, its temperature gradually increases. The efficiency of heat transfer in a heat exchanger in transferring heat energy from the hot flue products of combustion to the fluid within the heat exchanger tubes depends on the total amount of heat transferred and this is a function of the surface area, the temperature differential and the heat transfer and resistance coefficients. By following the flow path defined according to the invention, substantially equal temperature differentials throughout the entire flow path is achieved.

The flue products of combustion from which heat energy is transferred to a fluid passing through heat exchanger tubes disposed in its path, generally originate from a plurality of burners disposed in a combustion chamber. The combustion process is completed within the combustion chamber. Usually there is a certain amount of turbulence within the combustion chamber which causes the individual heat exchanger tubes to reach different temperatures. Burners may be arranged in a great number of positions including those where the burner ports are concentrated in the center of the combustion chamber, at times at the periphery of the combustion chamber, etc., thus creating additional temperature differences between the individual heat exchanger tubes.

According to the invention a flow path for the fluid is defined to enable the fluid flow to be directed so that the fluid passes the coldest heat exchanger tubes first before it passes the hottest heat exchanger tubes so as to improve the heat transfer efficiency of the total heat exchanger device by providing minimum variation in temperature differentials between the interior of the particular heat exchanger tube and the ambient surroundings along the entire path. The flow path defined and illustrated in FIG. 2 is intended for use in fluid heater appliances where the temperature within the combustion chamber is highest at the periphery, that is lowest in the center.

Figure 6:
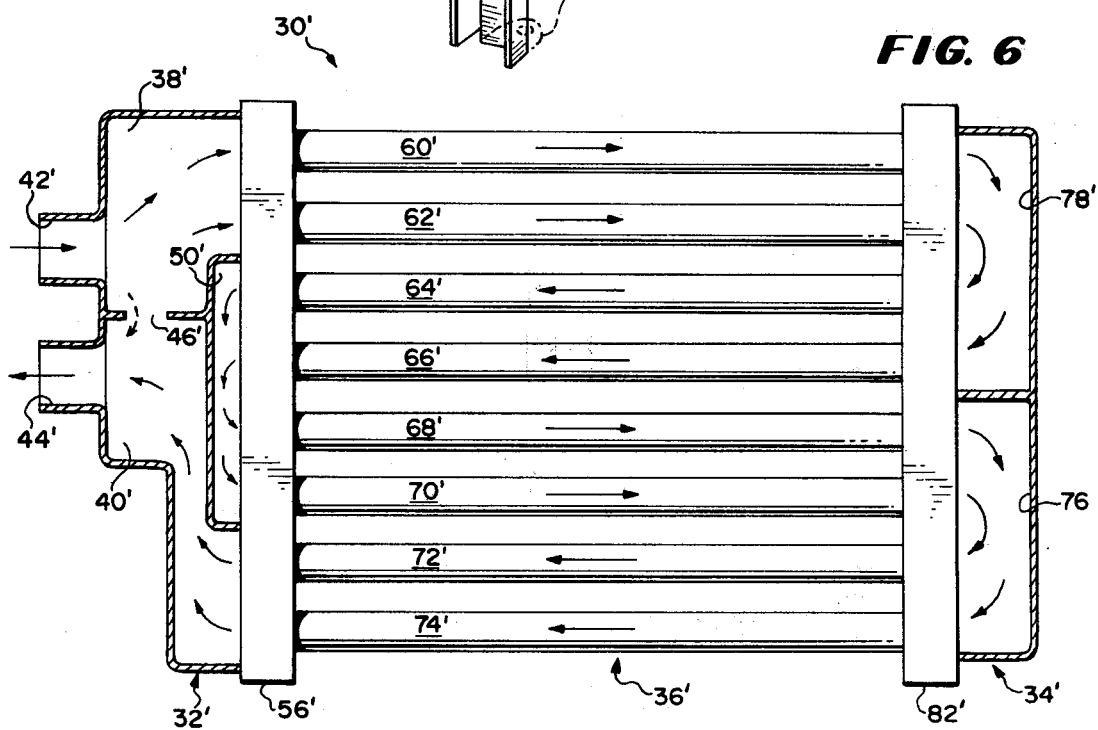
FIG. 6 is a diagrammatic representation similar to that of FIG. 2 but illustrating a modified embodiment of the heat exchanger according to the invention.

Accordingly, the inlet water which is coldest, traverses tubes located in the center of the plenum thereafter traversing, in order, tubes located at the periphery. The path illustrated in FIG. 16 is intended for use in fluid heater appliances where the combustion chamber is coldest at one periphery, that is, the burner ports are concentrated in a different location of the combustion chamber. Accordingly, the flow path, see arrows, in the arrangement of FIG. 6 is defined so as to enable the inlet fluid to pass first through the colder heat exchanger tubes along one periphery of the combustion chamber and thence through the remaining heat exchange tubes in order of their increasing temperature dependent upon their disposition in the combustion product path. Prime numbers are used for like parts. No baffle is used here.

Referring to FIGS. 2 and 3, there is illustrated one embodiment of the flow restrictor means 48 provided by the invention. Here, flow restrictor means 48 comprises a baffle 84 formed of spring metal and having a planar rectilinear portion 86 and a connecting arm 88 integral therewith a right angles thereto. An upstanding elongate tab 90 is struck from arm 88 and bent at right angle to the planar surface of arm 88. The tab 90 is arranged parallel to the elongate edges of arm 88. Upstanding tab 92 is formed along the free edge of arm 88 and is disposed normal to the arm 88. Arm 88 has a pair of depending legs 94 and 96 integral therewith and disposed at right angles thereto. Tabs 90' and 92' corresponding to tabs 90 and 92 and coplanar therewith respectively are formed along the edges of legs 94 and 96 respectively, thus defining a U-shaped channeled member or frame. Optionally, inwardly directed tabs 98 are provided at the ends of legs 94 and 96 respectively. Tabs 98 are bent at an acute angle relative to the legs 94 and 96 so as to facilitate assembly of the flow restrictor means 48 to the walls defining the by-pass passage 46. The tabs 90 and 92 define a channel 100 for receiving one of the passage defining walls while the tabs 90' and 92' on legs 94 and 96 respectively define suitable channels 100' and 100" to receive the oppositely located passage defining walls. Suitable openings 98' may be provided in the tabs 98 for facilitating the assembly of the baffle 84 to the heat exchanger walls. The resultant U-shaped frame defined by legs 94, arm 88 and leg 96 and the baffle portion 86 of means 48 preferably is formed of spring metal such as brass, bronze or stainless steel, even plastic and is responsive to pressure for the purpose of deflection. The baffle 86 can also be formed of a bimetallic material so as additionally to be responsive to temperature changes.

The baffle 84 is installed by deflecting the arms 94 and 96 toward one another so that the walls defining the by-pass passage 46 are received within the channels 100 and 100'. The frame is pivoted around the connecting channels, that is channel 100, until the frame portion is inside the opening 46 parallel to the opening defining walls. The legs 94 and 96 are then released and the baffle 84 so secured to position the portion 86 thereof spaced slightly from the mouth of by-pass opening 46.

The size of the opening 46 and of the clearances, that is the distance between the mouth of said opening and the baffle portion 86, enables the flow through the heat exchanger tubes 36 to be adjusted to obtain optimum flow velocity. The thickness of portion 86 determines the corresponding force required for deflection of the baffle portion 86 to cause an increase in the clearance, determining the amount of fluid moving through the by-pass 46 without change in the optimum velocity flow through the heat exchanger tubes. Of note is the fact that the flow restrictor means comprising the baffle portion 86 provides for a constant flow through the heat exchanger tubes independent of changes in the pressure at the inlet port which can occur when dirt, debris, etc. collect within the supply lines, filters, etc. Continuous flow is permitted through the by-pass opening; thus the flow restrictor means is self-cleaning and build up of scale, lime or dirt is prevented. Also, because the flow restrictor means according to the invention is not made of moving parts, usually encountered bearing surfaces will not malfunction or become struck, clogged or frozen during extended use. This structure is, as can be noted, inexpensive to manufacture, easy to install and does not require commonly encountered complet and/or machined by-pass openings. While the flow restrictor means according to the invention has been described as one for use in heat exchanger by-pass for a fluid heater of the continuous flow, tube type, the structure may easily be modified for operation with any heating medium whether it be oil or otherwise or any type of heat exchanger apparatus.

Figure 5:
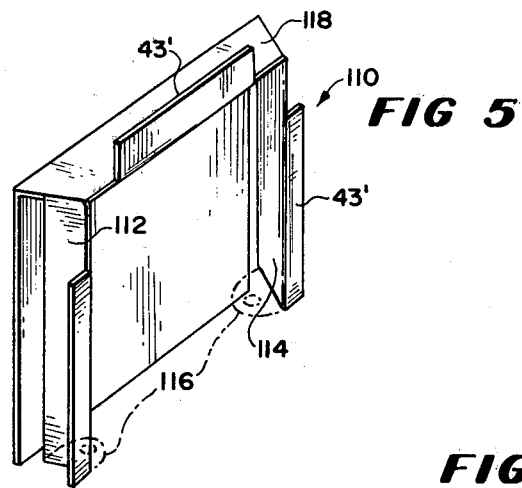
FIG. 5 is a perspective view of a modified embodiment of the flow restrictor means constructed in accordance with the invention.

Referring to FIG. 5 there is illustrated another embodiment of the flow restrictor means 48 differing somewhat from the embodiment illustrated in FIGS. 2 and 3. The modified embodiment of the flow restrictor means according to the invention is designated generally by reference character 110 and differs from baffle member 84 by having its legs 112 and 114 in cooperation with upstanding tabs 116 forming a V-shaped section instead of a U-shaped section and by having its connecting channel 118 in cooperation with tab 43' to form a V-shaped cross section instead of a U-shaped cross section. Baffle assembly 110 is suitable for use where the mouth of the by-pass opening 46 is defined by tapered walls of blade-like cross section so that the mouth of the opening is flared outward toward the outlet chamber.

The invention is applicable for multi-row tubular type heat exchangers as well as the single row type illustrated.

What we claim is:

1. A continuous flow fluid heater comprising: heat exchange means, means defining an outlet for delivering fluid to be heated to said heat exchange means and means defining an outlet for receiving heated fluid from said heat exchange means and delivering said heated fluid therefrom, means defining a by-pass passage capable of diverting continuously a selected portion of said fluid to be heated from said inlet to said outlet independent of said heat exchange means, and flow control means arranged at said by-pass passage adjustably to control the quantity of diverted fluid between a minimum quantity and a variable quantity related to pressure conditions within said inlet, said flow control means comprising resilient deflectable baffle and means for securing said a resilient baffle positioned over said by-pass passage and spaced therefrom to define a minimum clearance passage effective to maintain continuous fluid flow through said by-pass passage, said baffle being deflectable about an axis spaced from said by-pass passage.

2. The structure as claimed in claim 1 in which said baffle is responsive to fluid pressure within said inlet whereby variably to increase the clearance between it and said by-pass passage.

3. The structure as claimed in claim 2 in which said baffle is a planar member of spring metal.

4. The structure as claimed in claim 2 in which said baffle member is formed of a bimetallic material whereby to be responsive additionally to temperature conditions within said inlet.

5. The structure as claimed in claim 1 in which said securing means comprise framing means secured within said by-pass passage and bridging means integral with said baffle and said framing means for establishing said minimum clearance.

6. The structure as claimed in claim 1 in which said baffle comprises a spring metal member.

7. The structure as claimed in claim 1 in which said means securing said baffle at the by-pass opening comprises a U-shaped frame of size and configuration selected to seat within said by-pass passage, means on said frame for retaining same within said passage and bridging means joining said baffle to said frame.

8. The structure as claimed in claim 7 in which the arms of said frame lie in parallel planes.

9. The structure as claimed in claim 7 in which said arms of said frame line in intersecting planes.

10. A continuous flow fluid heater comprising: heat exchange means, means defining an inlet for delivering fluid to be heated to said heat exchange means and means defining an outlet for receiving heated fluid from said heat exchange means and delivering said heated fluid therefrom, means defining a by-pass passage capable of diverting a selected portion of said fluid to be heated from said inlet to said outlet independent of said heat exchange means, and flow control means arranged at said by-pass passage adjustably to control the quantity of diverted fluid between a minimum quantity and a variable quantity related to pressure conditions within said inlet, said flow control means comprising resilient baffle means and means for securing said resilient baffle means in intercepting relation to flow through said by-pass passage, and last-mentioned securing means comprising a U-shaped frame of size and configuration to enable seating within said by-pass passage, means on said frame for retaining same within said passage and connecting means joining said baffle means to said frame, tab means on said frame at the free ends of the arms thereof and directed inwardly of said frame, said tab means capable of securement within said by-pass passage.

11. The structure as claimed in claim 1 in which said heat exchange means comrises a plurality of hollow tubular heat exchanger elements arranged in heat exchange relation with a heating medium wherein the temperature varies between areas thereof, said heat exchange elements being coupled between said inlet means and said outlet means and means defining a flow path through said heat exchanger elements by way of selected ones of said tubes in the direction of continuously increasing tube temperature whereby the temperature differential between the ambient to which the tube is subjected and the interior of the tubular element is minimized along the length of said path.

12. The structure as claimed in claim 11 in which said flow path first traverses the cooler tubes, then continues through the plural tubes in the direction of increasing temperature.

13. A continuous flow heat exchanger of the tubular type which includes an inlet, an outlet, a plurality of tubular elements communicating between the inlet and the outlet and disposed in heat transfer relation to a differentially heated medium wherein there are areas of differing temperature, means defining a flow path to direct the fluid to be heated through the tubes from the inlet to the outlet in order or increasing tube temperature whereby the temperature differential between the ambient to which the tube is subjected and the interior temperature of the fluid within the tube is minimized progressively along said flow path, and means are provided defining a by-pass passage between the inlet and the outlet independent of said tubes, said by-pass passage having a deflectable baffle disposed in intercepting relation to fluid flow therethrough, said baffle being spaced from said passage to define a minimum clearance to enable continuous flow of fluid from the inlet therethrough, the clearance between said by-pass passage and said baffle being variable above said minimum, responsive to fluid pressure within the onlet, said baffle being deflectable about an axis spaced from said by-pass passage.

14. The heat exchanger is claimed in claim 13 in which said baffle comprises a resilient sheet member.

15. The structure as claimed in claim 13 in which said baffle is formed of spring metal.

16. The structure as claimed in claim 14 in which said baffle is formed of a bimetal whereby to be additionally temperature responsive.

17. The structure as claimed in claim 13 in which said baffle comprises a sheet of spring metal held fixedly a predetermined distance from the mouth of said by-pass passage to establish said minimum clearance.

18. The structure as claimed in claim 17 in which said spring metal is bimetallic, being responsive additionally to temperature to vary the clearance.

* * * * *

UNITED STATES PATENT AND TRADEMARK OFFICE
CERTIFICATE OF CORRECTION

PATENT NO. : 3,920,067
DATED : November 18, 1975
INVENTOR(S) : HERBERT SCHINDLER, et al.

It is certified that error appears in the above-identified patent and that said Letters Patent are hereby corrected as shown below:

Col. 1, line 18, change "general" to --generally--; col. 1, line 43, change "ad" to --and--; col. 3, line 48, change "ofa" to --of a--; col. 4, line 16, change "other" to --others--; col. 4, line 23, before "chamber" insert --inlet--; col. 4, line 40, change "header" to --headers-- col. 4, line 43, change "alinged" to --aligned--; col. 4, line 46, between "so" and "to" insert --as--; col. 5, line 50, change "16" to --6--; col. 6, line 10, put quotes around "U-shaped"; col. 6, line 64, change "complet" to --complex--; col. 7, line 25, change "outlet" to --inlet--; col. 8, line 51, change "or" to --of--; col. 8, line 67, change "is" to --as--

Signed and Sealed this

Twenty-second Day of February 1977

[SEAL]

Attest:

RUTH C. MASON
*Attesting Officer*

C. MARSHALL DANN
*Commissioner of Patents and Trademarks*